(12) United States Patent
Tscherkaschin

(10) Patent No.: US 9,771,961 B1
(45) Date of Patent: Sep. 26, 2017

(54) KIT FOR MOUNTING A WOODEN FIXTURE SUCH AS A HANDRAIL OR PANEL TO A SUPPORTING STRUCTURE WITHOUT INTERRUPTING ITS ATTRACTIVE FACE THEREBY

(71) Applicant: Nikolai Tscherkaschin, Mitchell (CA)

(72) Inventor: Nikolai Tscherkaschin, Mitchell (CA)

( * ) Notice: Subject to any disclaimer, the term of this patent is extended or adjusted under 35 U.S.C. 154(b) by 0 days.

(21) Appl. No.: 15/201,557

(22) Filed: Jul. 4, 2016

(51) Int. Cl.
F16B 5/02 (2006.01)
F16M 13/02 (2006.01)
E04F 11/18 (2006.01)

(52) U.S. Cl.
CPC ............ *F16B 5/02* (2013.01); *E04F 11/1804* (2013.01); *F16M 13/02* (2013.01)

(58) Field of Classification Search
CPC ......... E04F 11/1804; F16M 13/02; F16B 5/02
USPC ................................... 411/388, 389
See application file for complete search history.

(56) References Cited

U.S. PATENT DOCUMENTS

| 839,821 | A | * | 1/1907 | Dumont | F16B 39/06 411/321 |
|---|---|---|---|---|---|
| 4,373,309 | A | * | 2/1983 | Lutz | E04F 11/035 403/168 |
| 4,393,638 | A | * | 7/1983 | Sell | F16B 13/002 405/259.6 |
| 4,520,601 | A | * | 6/1985 | Stacey, Jr. | B64G 1/58 244/159.1 |
| 4,875,710 | A | * | 10/1989 | Mercado | F16L 47/16 285/24 |
| 4,890,964 | A | * | 1/1990 | Lindley | F16B 39/36 411/270 |
| 5,502,982 | A | * | 4/1996 | Venetucci | F17C 3/04 312/236 |
| 6,953,313 | B2 | * | 10/2005 | Tylosky | F16B 7/06 403/322.2 |
| 8,997,422 | B1 | * | 4/2015 | Kim | E04B 1/161 52/422 |
| 2015/0198189 | A1 | * | 7/2015 | Hsu | F16B 5/02 411/366.1 |
| 2016/0076567 | A1 | * | 3/2016 | Yamamoto | F16B 5/02 411/366.2 |
| 2016/0242301 | A1 | * | 8/2016 | Jung | F16M 13/02 |

* cited by examiner

*Primary Examiner* — Paola Agudelo
(74) *Attorney, Agent, or Firm* — Adrian D Battison; Ryan W. Dupuis; Ade & Company Inc.

(57) ABSTRACT

A kit for mounting a wooden fixture comprising a body of wood, such as a handrail or a ceiling panel, on a supporting structure features a pair of brackets each for fastening to one of the wooden fixture and the supporting structure. Each bracket has a threaded surface which is threaded in an opposite rotational direction to the other bracket. That is, one bracket has right hand threading and the other bracket has left hand threading. The kit includes a coupling with a first surface portion which is threaded in the same direction as a first one of the brackets for mating therewith and a second surface portion threaded in the same direction as a second one of the brackets for mating therewith. The coupling is thus arranged for threadable mating with both brackets concurrently in a manner mounting the fixture but leaving a front face thereof uninterrupted.

16 Claims, 13 Drawing Sheets

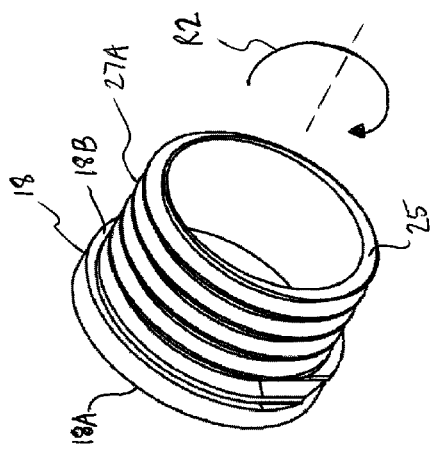
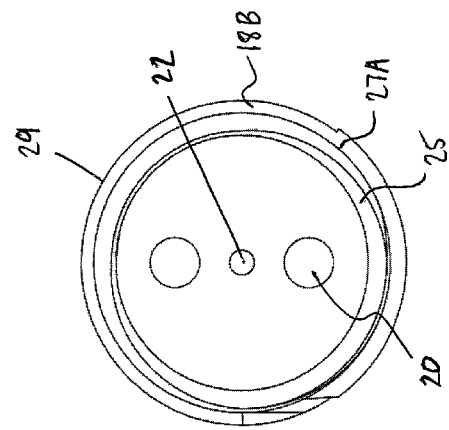
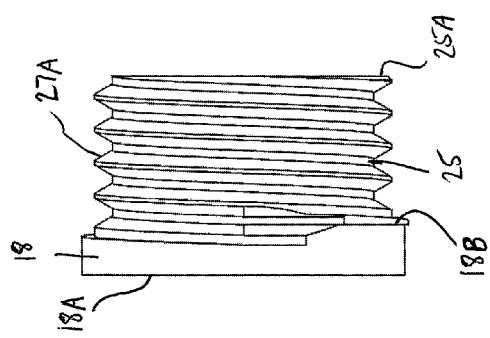
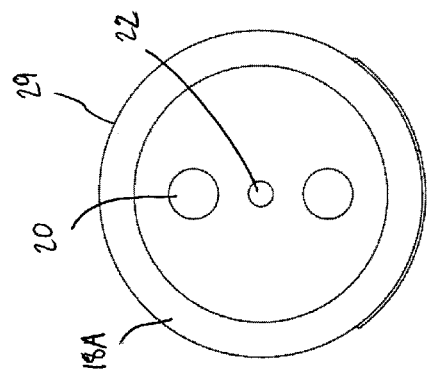

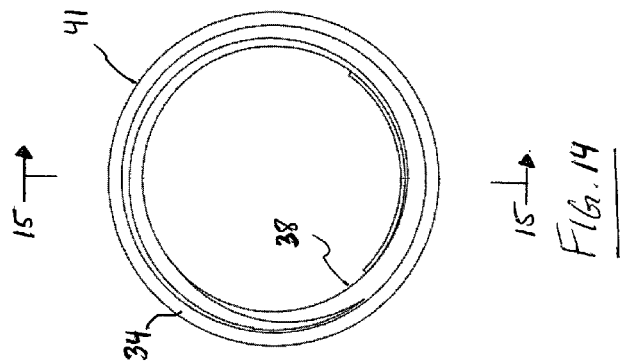
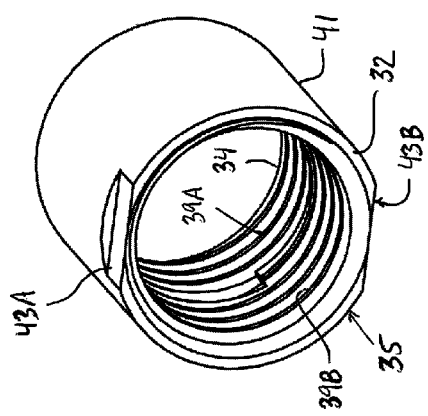
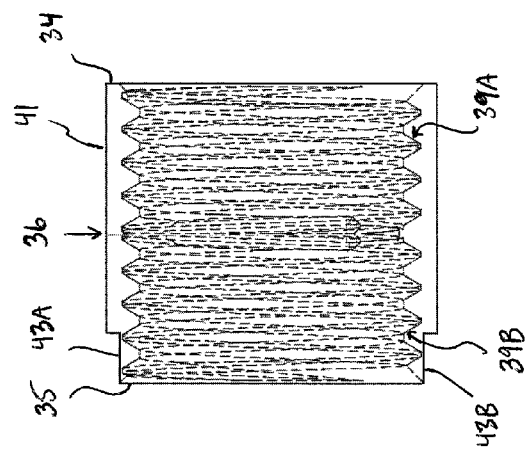
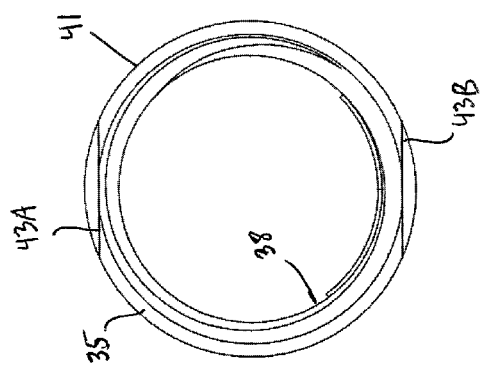

KIT FOR MOUNTING A WOODEN FIXTURE SUCH AS A HANDRAIL OR PANEL TO A SUPPORTING STRUCTURE WITHOUT INTERRUPTING ITS ATTRACTIVE FACE THEREBY

FIELD OF THE INVENTION

The present invention relates to a kit of cooperating parts for mounting a wooden fixture, for example a handrail or a ceiling panel, to a supporting structure, for example one or more wall studs or posts in the case of the handrail or one or more ceiling beams in the case of the ceiling panel. More particularly, the kit of cooperating parts is arranged to facilitate mounting of the wooden fixture without altering an attractive face thereof arranged to face away from the supporting structure, for example where using traditional methods and mounting kits a hole must be drilled through a thickness of a wooden body of the fixture in order to pass a fastener therethrough to connect to the mounting bracket at the supporting structure.

SUMMARY OF THE INVENTION

According to an aspect of the invention there is provided a kit for mounting a wooden fixture comprising a body of wood on a supporting structure formed by at least one or more support members arranged at spaced positions from one another comprising:

a first bracket including a base arranged for fastening to the supporting structure;

the base of the first bracket having a first face for abutting the supporting structure and a second face opposite thereto;

the first bracket including a cylindrical body extending longitudinally from the base at its second face to a distal end of the cylindrical body which is spaced longitudinally from the second face;

the cylindrical body of the first bracket having a surface which is threaded so as to follow a helical path winding about the cylindrical body from the second face of the base to the distal end of the cylindrical body in a first rotational direction;

said surface of the cylindrical body of the first bracket that is threaded being an outside surface of the cylindrical body;

a second bracket including a base arranged for fastening to the wooden fixture;

the base of the second bracket having a first face for abutting the wooden fixture and a second face opposite thereto;

the second bracket including a cylindrical body extending longitudinally from the base of the second bracket at the second face of the base to a distal end of the cylindrical body which is spaced longitudinally from the second face of the base of the second bracket;

the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;

said surface of the cylindrical body of the second bracket that is threaded being an outside surface of the cylindrical body;

the first and second brackets including a fastening arrangement arranged for providing connection of the first bracket to the supporting structure and the second bracket to the wooden fixture;

a coupling forming a body extending along a longitudinal axis with first and second ends on either side of a central area of the coupling;

the coupling having a surface at each of the first and second ends that is threaded;

the first and second ends of the coupling being open;

the coupling being hollow at the first and second ends such that said surface of the coupling thereat which is threaded is an interior surface of the coupling;

the threaded surface having a first portion extending longitudinally inwardly from the first end of the coupling towards the central area and a second portion extending longitudinally inwardly from the second end of the coupling towards the central area;

the first portion of said surface of the coupling being threaded so as to follow a helical path winding about the body from the first end inwardly towards the central area in the first rotational direction so as to cooperate with threading of the first bracket for mating with the first bracket;

the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure.

As such, the wooden fixture is arranged to have a floating appearance upon the supporting structure in the installed state. An attractive face of the wooden fixture, which is opposite the face where the second bracket is attached, does not need to be interrupted to facilitate connection of the fixture to the first bracket at the supporting structure.

In one arrangement the distal end of the cylindrical body of the first and second brackets is open and the cylindrical body thereof is hollow along its length from the distal end to the second face of the base.

Typically the base of the first and second brackets extends radially beyond the outside surface of the cylindrical body. Thus the second face of the base may provide a bearing surface for the coupling in the installed state.

Preferably the coupling includes diametrically opposite surfaces on an outside thereof which are flat for gripping to rotate the coupling in threadable mating with the first and second brackets.

For example, the coupling may have at least a portion of its outside surface which is rectangular (for example, square) in cross-section thereby defining the diametrically opposite surface for gripping the coupling to rotate same. In another example, the outside surface of the coupling may be substantially circular cylindrical with diametrically opposite areas which are flattened to define the gripping surfaces for rotating the coupling.

Preferably each one of the first and second brackets includes a ring of compressible material at the second face of the base encircling the outside surface of the cylindrical body that is arranged for sandwiching between the respective one of the first and second ends of the coupling and the base of the respective one of the first and second brackets.

Thus in this arrangement a face of the ring of compressible material distal to the second face of the base defines a bearing surface for the coupling that is movable relative to the base of the bracket which is fixed. As such, even if an end of the coupling is touching the ring of compressible material the coupling may still be rotated in a manner which acts to draw the bracket in closer to the central area of the coupling for tightening the connection. Additional such rotations of the coupling are not possible once the end of the coupling is touching the base of the respective bracket (in an arrangement where no compressible material is provided).

Typically, this ring of compressible material has a thickness which is negligible compared to the length of the coupling from the first to second end.

Preferably the coupling is hollow along its length from the first end to the second end.

Typically the fastening arrangement of each of the first and second brackets comprises at least one aperture extending longitudinally through the base form the first face to the second face for passing a conventional fastener therethrough.

In other arrangements the base may include rigid tabs projecting substantially perpendicularly from the first face of the base that may be driven into the body of the wooden fixture or the supporting structure, for example by hammering the respective bracket against the body of the fixture or the supporting structure.

According to another aspect of the invention there is provided a kit for mounting a wooden fixture comprising a body of wood on a supporting structure formed by at least one or more support members arranged at spaced positions from one another, in combination with the wooden fixture and the supporting structure, comprising:

a first bracket including a base arranged for fastening to the supporting structure;

the base of the first bracket having a first face for abutting the supporting structure and a second face opposite thereto;

the first bracket including a cylindrical body extending longitudinally from the base at its second face to a distal end of the cylindrical body which is spaced longitudinally from the second face;

the cylindrical body of the first bracket having a surface which is threaded so as to follow a helical path winding about the cylindrical body from the second face of the base to the distal end of the cylindrical body in a first rotational direction;

said surface of the cylindrical body of the first bracket that is threaded being an outside surface of the cylindrical body;

a second bracket including a base arranged for fastening to the wooden fixture;

the base of the second bracket having a first face for abutting the wooden fixture and a second face opposite thereto;

the second bracket including a cylindrical body extending longitudinally from the base of the second bracket at the second face of the base to a distal end of the cylindrical body which is spaced longitudinally from the second face of the base of the second bracket;

the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;

said surface of the cylindrical body of the second bracket that is threaded being an outside surface of the cylindrical body;

the first and second brackets including a fastening arrangement arranged for providing connection of the first bracket to the supporting structure and the second bracket to the wooden fixture;

a coupling forming a body extending along a longitudinal axis with first and second ends on either side of a central area of the coupling;

the coupling having a surface at each of the first and second ends that is threaded;

the first and second ends of the coupling being open;

the coupling being hollow at the first and second ends such that said surface of the coupling thereat which is threaded is an interior surface of the coupling;

the threaded surface having a first portion extending longitudinally inwardly from the first end of the coupling towards the central area and a second portion extending longitudinally inwardly from the second end of the coupling towards the central area;

the first portion of said surface of the coupling being threaded so as to follow a helical path winding about the body from the first end inwardly towards the central area in the first rotational direction so as to cooperate with threading of the first bracket for mating with the first bracket;

the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure;

the wooden fixture having a face arranged for facing the supporting structure;

the supporting structure defining a face arranged for facing the wooden fixture;

in the installed state including when the first bracket is fastened to the supporting structure and the second bracket is fastened to the wooden fixture, the second face of the base of the second bracket being contiguous with the face of the wooden fixture and the coupling being received over the cylindrical bodies of the first and second brackets such that the second end of the coupling is at the face of the wooden fixture.

This provides a clean appearance in the space between the wooden fixture and the supporting structure with only the coupling substantially visible.

In one arrangement there is provided for each one of the first and second brackets a ring of compressible material encircling the outside surface of the cylindrical body and wherein the ring of compressible material is sandwiched between the second face of the base thereof and the respective end of the coupling so that the second end of the coupling is spaced from the face of the wooden fixture by a thickness of the ring of compressible material.

The thickness of the ring of compressible material is typically negligible in comparison to the length of the coupling from the first end to the second end.

Typically the first face of the base of the first bracket is arranged in butting engagement with the face of the supporting structure.

A thickness of the base of the first bracket from the first face to the second face is typically negligible in comparison to the length of the coupling such that the base of the first bracket is not substantially visible.

In other arrangements the first bracket is arranged in the installed state such that the second face of the base thereof is contiguous with the face of the supporting structure such that the first end of the coupling is at the face of the supporting structure.

In one arrangement the base of the first bracket fastened to the supporting structure extends radially outwardly beyond the outside surface of the cylindrical body of the first bracket.

The wooden fixture preferably has an attractive existing front face opposite the face where the second bracket is fastened, the attractive existing front face facing away from the supporting structure and being uninterrupted in the installed state of the kit.

According to another aspect of the invention there is provided a method for mounting a wooden fixture on a supporting structure formed by at least one or more support members arranged at spaced positions from one another comprising:

providing a kit for mounting the wooden fixture on the supporting structure, the kit comprising:
- a first bracket including a base arranged for fastening to the supporting structure;
- the base of the first bracket having a first face for abutting the supporting structure and a second face opposite thereto;
- the first bracket including a cylindrical body extending longitudinally from the base at its second face to a distal end of the cylindrical body which is spaced longitudinally from the second face;
- the cylindrical body of the first bracket having a surface which is threaded so as to follow a helical path winding about the cylindrical body from the second face of the base to the distal end of the cylindrical body in a first rotational direction;
- a second bracket including a base arranged for fastening to the wooden fixture;
- the base of the second bracket having a first face for abutting the wooden fixture and a second face opposite thereto;
- the second bracket including a cylindrical body extending longitudinally from the base of the second bracket at the second face of the base to a distal end of the cylindrical body which is spaced longitudinally from the second face of the base of the second bracket;
- the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;
- the first and second brackets including a fastening arrangement arranged for providing connection of the first bracket to the supporting structure and the second bracket to the wooden fixture;
- a coupling forming a body extending along a longitudinal axis with first and second ends on either side of a central area of the coupling;
- the coupling having a surface at each of the first and second ends that is threaded;
- the threaded surface of the coupling having a first portion extending longitudinally inwardly from the first end of the coupling towards the central area and a second portion extending longitudinally inwardly from the second end of the coupling towards the central area;
- the first portion of said surface of the coupling being threaded so as to follow a helical path winding about the body from the first end inwardly towards the central area in the first rotational direction so as to cooperate with threading of the first bracket for mating with the first bracket;
- the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure;

providing the wooden fixture which has a back face arranged for facing the supporting structure;

the wooden fixture having an attractive existing front face arranged for facing away from the supporting structure;

providing the supporting structure which defines a front face arranged for facing the wooden fixture;

fastening the first bracket to the supporting structure at the front face thereof with the first face of the base of the first bracket in butting engagement with the supporting structure;

fastening the second bracket to the wooden fixture at the back face thereof with the first face of the base of the second bracket in butting engagement with the wooden fixture;

with the threaded cylindrical bodies of the first and second brackets which are attached to the respective one of the supporting structure and the wooden fixture held spaced apart and which are arranged longitudinally inline one with another, threadably mating the coupling with each of the first and second brackets concurrently so as to mount the wooden fixture with the back face thereof towards the supporting structure leaving the attractive existing front face of the wooden fixture uninterrupted.

Typically the step of fastening the second bracket to the wooden fixture comprises forming an opening in the back face thereof to receive the second bracket.

As such, the wooden fixture may be adapted on site of installation for receiving the second bracket by for example drilling a conventional opening at the back face of the fixture. Thus the wooden fixture need not be prefabricated with an opening having a complex geometry for receiving the second bracket that cannot otherwise be formed readily by traditional hand tools and using ordinary skill.

Preferably the first face of the base of the second bracket is recessed from the back face of the wooden fixture in the installed state such that the second face of the base is contiguous therewith.

Typically the step of fastening the first bracket to the supporting structure comprises forming an opening in the front face thereof to receive the first bracket.

The first face of the base may be recessed from the front face of the supporting structure and thus the second face of the base may be contiguous with the front face of the supporting structure upon installation.

Preferably the step of threadably mating the coupling comprises rotating the coupling in a single rotational direction to draw the first and second brackets towards one another.

In one arrangement it is the outside surface of the cylindrical body of each of the first and second brackets which is threaded, and an interior surface of the coupling is threaded to cooperate therewith.

In another arrangement the distal end of the cylindrical body of each of the first and second brackets is open and the cylindrical body is hollow such that an interior surface thereof is threaded, and an outside surface of the coupling is threaded to cooperate therewith.

BRIEF DESCRIPTION OF THE DRAWINGS

Preferred arrangements of the invention will now be described in conjunction with the accompanying drawings in which:

FIG. 9 is a perspective view of second bracket arranged for fastening to the wooden fixture.

FIG. 10 is a back end view of the second bracket of FIG. 9.

FIG. 11 is a side elevational view of the second bracket of FIG. 9.

FIG. 12 is a front end view of the second bracket of FIG. 9.

FIG. 13 is a perspective view of a first arrangement of coupling as illustrated in FIG. 1.

FIG. 14 is an end view from a first end of the coupling of FIG. 13.

FIG. 15 is a cross-sectional view along line 15-15 of the coupling.

FIG. 16 is an end view from a second end of the coupling of FIG. 13.

In the drawings like characters of reference indicate corresponding parts in the different figures.

DETAILED DESCRIPTION

Figure 1:
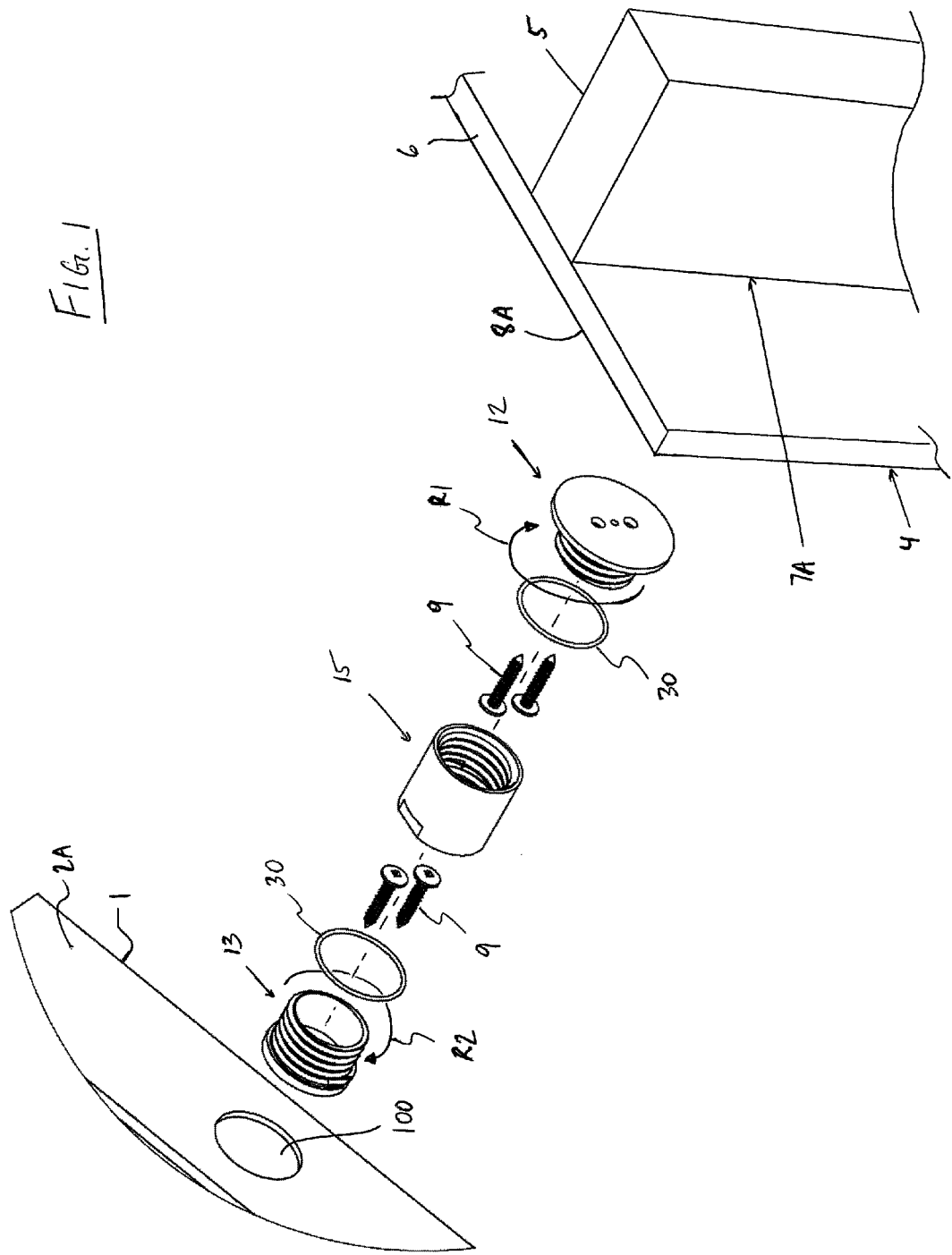
FIG. 1 is an exploded view of kit for mounting a wooden fixture to a supporting structure according to the present invention.
Figure 2:
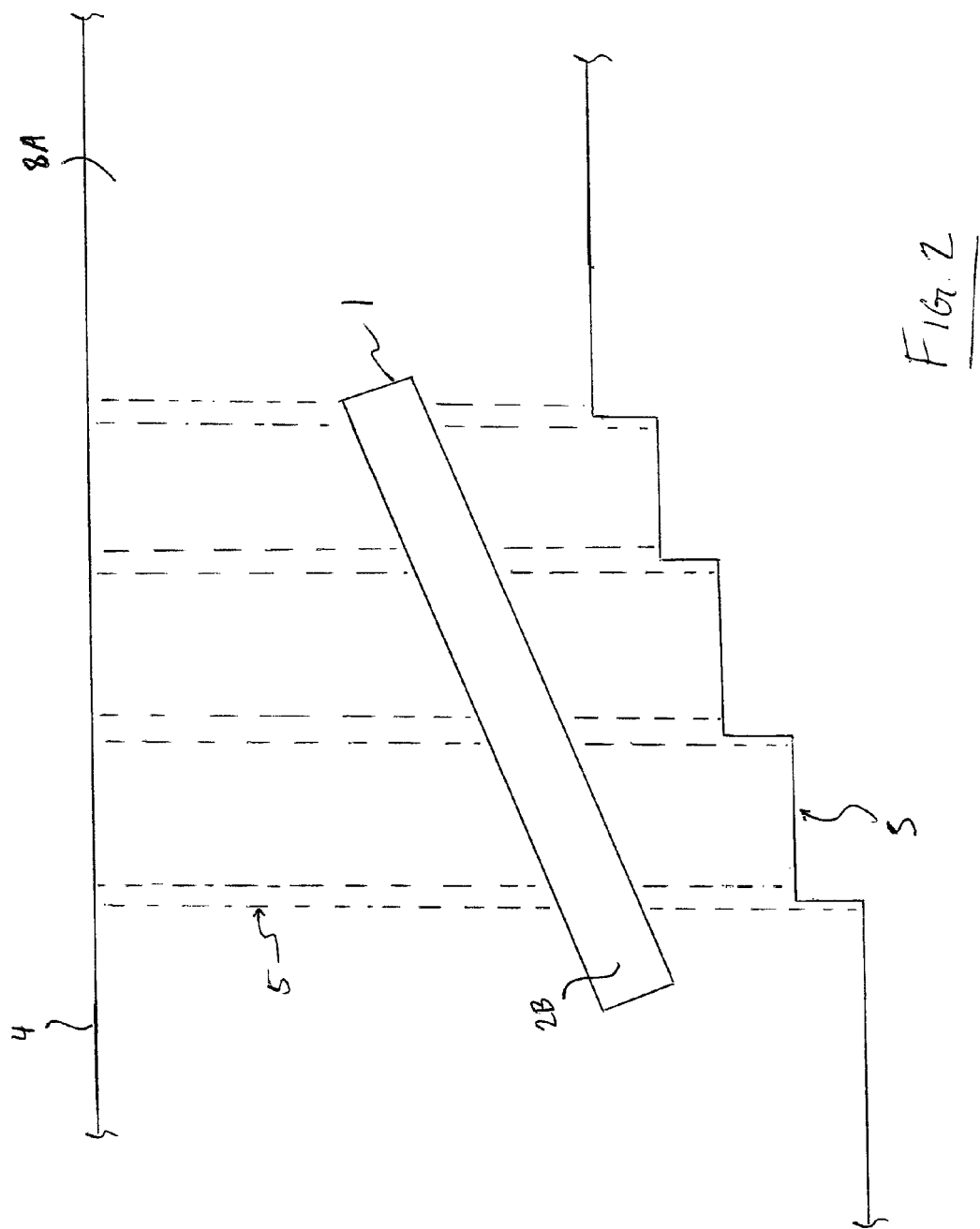
FIG. 2 is an elevation view of a handrail mounted using the kit illustrated in FIG. 1 with stairs schematically illustrated.
Figure 3:
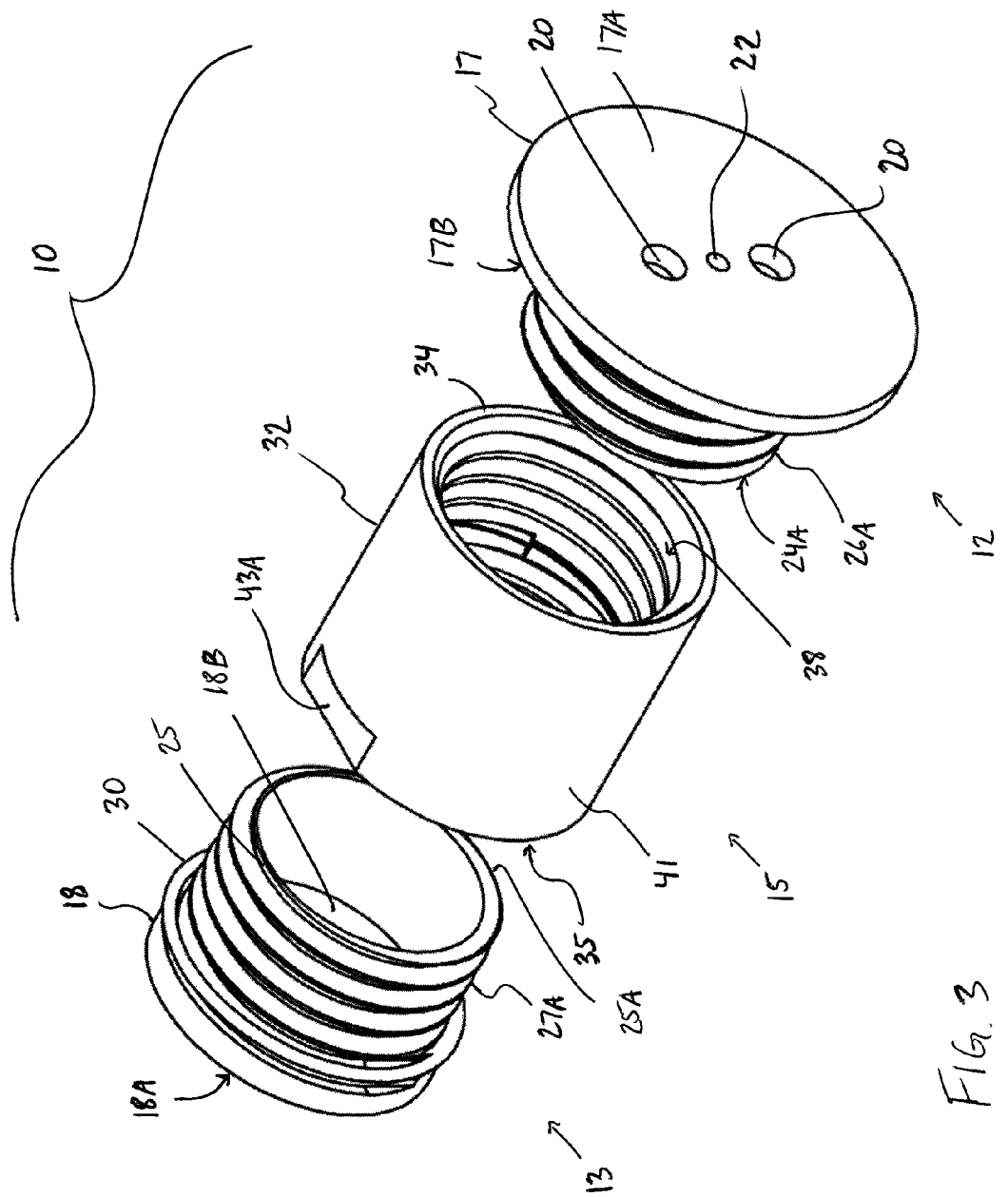
FIG. 3 is a perspective view of the kit of FIG. 1.
Figure 4:
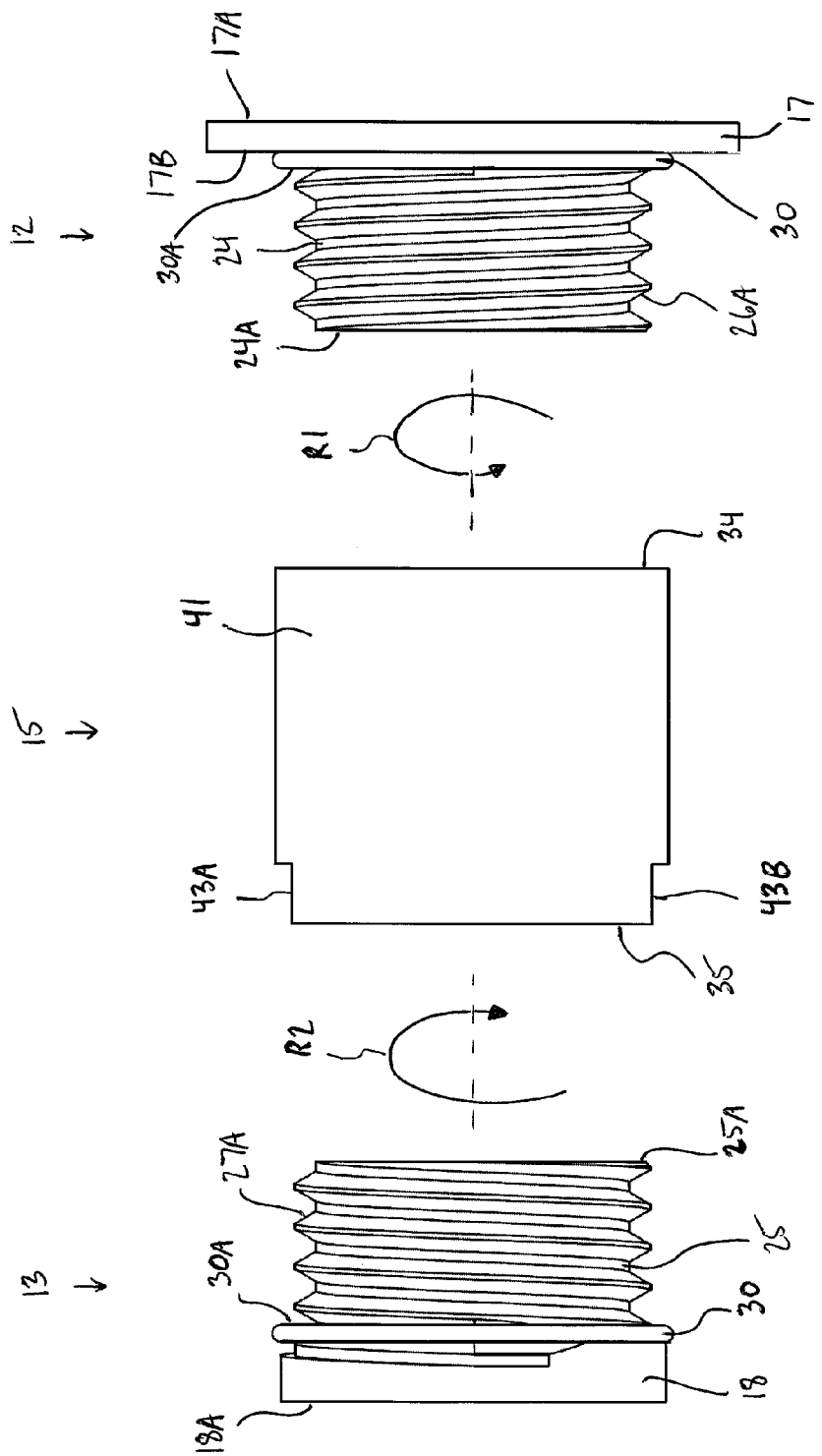
FIG. 4 is an elevational view of the kit of FIG. 1.
Figure 5:
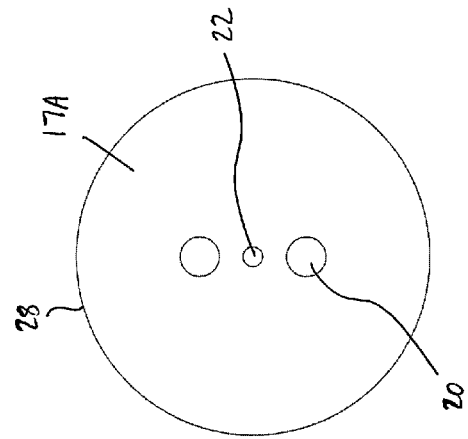
FIG. 5 is a perspective view of first bracket arranged for fastening to the supporting structure.
Figure 6:
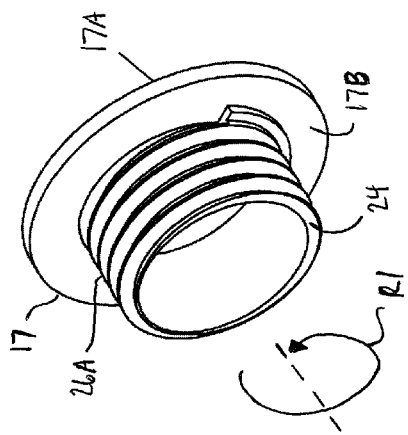
FIG. 6 is a front end view of the first bracket of FIG. 5.
Figure 7:
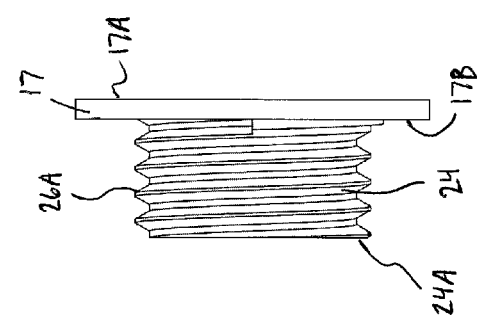
FIG. 7 is a side elevational view of the first bracket of FIG. 5.
Figure 8:
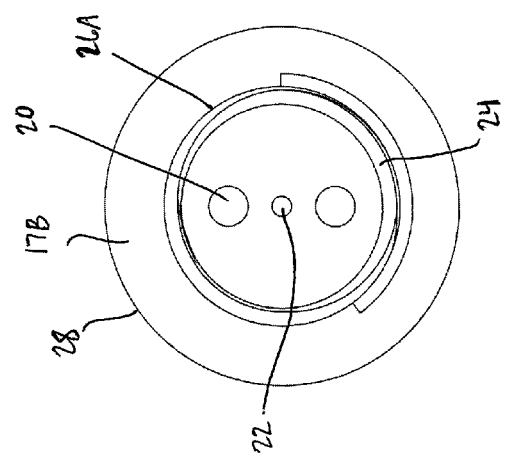
FIG. 8 is a back end view of the first bracket of FIG. 5.

There is illustrated in the accompanying figures a kit of cooperating components, generally indicated at reference numeral 10, which are arranged for mounting a wooden fixture 1 comprising a body of wood 2 on a supporting structure 4, for example a handrail on a wall (as illustrated in FIGS. 1 and 2) or a series of posts which are arranged along a periphery of an area to delimit same, or a ceiling panel on a ceiling.

Typically, the supporting structure 4 comprises a plurality of support members 5 each elongated in a first direction of the supporting structure and each spaced from the next in a second direction transversely of the first direction. In some cases, the supporting structure 4 includes one or more covering sheets 6 arranged at a mounting face 7A of the supporting structure defined collectively by faces of the support members 5 facing outwardly in a common direction. The respective covering sheet 6 thus acts to cover the support members and defines an outer face 8A of the supporting structure. The outer face 8A typically faces to a front of the structure 4. When the supporting structure is the wall as illustrated in FIGS. 1 and 2, the support members are typically wall studs 5 which are covered by drywall 6 defining the outer face 8A of the wall. If the supporting structure for the handrail is the series of posts then the support members are defined by the posts, and commonly there is no covering material arranged to conceal the posts. In the example of the ceiling panel, the support members may be ceiling beams.

Each covering sheet 6 on its own or cooperatively with other ones of the covering sheets is typically not suited for supporting a weight of the wooden fixture 1. Thus the wooden fixture is anchored to the support members 5 of the supporting structure so that the support members bear the weight of the wooden fixture.

In order to facilitate connection of the wooden fixture 1 to the supporting structure 4, the kit 10 comprises a pair of brackets 12, 13, with each bracket being arranged for fastening to one of the fixture 1 and the supporting structure 4, and a coupling 15 which is arranged for mating to both brackets 12 and 13 so as to bridge therebetween thereby affixing the wooden fixture at a location of the pair of the brackets thereon to the supporting structure.

Each one of the brackets 12 and 13 comprises a base 17, 18 at which the bracket is arranged for fastening to the respective one of the supporting structure 4 and the fixture 1. Each base has a first face 17A, 18A for abutting the respective one of the supporting structure and the fixture, that is the first face of the base is that placed against the respective one of elements 1 and 4, and a second face 17B, 18B which is opposite the first face. In the illustrated arrangement, the base 17, 18 of each bracket forms a plate which is disc-shaped with a pair of apertures 20 each extending longitudinally through the base from the first face 17A, 18A to the second face 17B, 18B so that a conventional fastener 9, such as a screw, which is typically sold separately of the kit 10 may be passed through the base 17, 18 to secure the respective bracket to the respective one of elements 1 and 4. The apertures 20 define a fastening arrangement of the respective bracket arranged for providing connection of the first bracket to the supporting structure and the second bracket to the wooden fixture.

Each base may also include a central aperture 22 separately of the apertures 20 which are used for passing the conventional fasteners 9 therethrough. The central aperture 22 is located centrally of the base and similarly to the apertures 20 extends from the first face 17A, 18A to the second face 17B, 18B. The central aperture 22 may thus be used to locate the respective bracket at a predetermined location on the respective one of the supporting structure and the fixture by aligning with a visual indicator formed thereon, for example a coloured spot formed with a writing utensil or an indent/imprint on the supporting structure, the central opening 22 of the bracket.

In the illustrated arrangements the apertures 20 lie along a diameter of the base, which is oriented perpendicularly transversely of the respective bracket, at spaced positions along the base's diameter.

Further to the base 17, 18 each one of the brackets 12, 13 includes a cylindrical body 24, 25 extending longitudinally from the base at its second face 17B, 18B to a distal end 24A, 25A of the cylindrical body which is spaced longitudinally from the second face. The cylindrical body is where the respective bracket is coupled to the coupling 15 of the kit 10.

Each cylindrical body 24, 25 has an outside surface 26A, 27A which is threaded so as to follow a helical path winding about the cylindrical body from the second face 17B, 18B of the base to the distal end 24A, 25A of the cylindrical body.

The anchoring bracket 12 for fastening to the supporting structure 4 has threading on its cylindrical body 24 which winds thereabout in a first rotational direction R1 from the second face 17B of the base to the distal end 24A. In the illustrated arrangements, the first rotational direction corresponds to right hand threading as will be understood by a person skilled in the art, which additionally or alternatively may be regarded as being clockwise about the cylindrical body 24 when the helical path of the threading starts at the base 17 and terminates at the distal end 24A.

In contrast, the fixture bracket 13 for fastening to the wooden fixture 1 has threading on its cylindrical body 25 which winds thereabout from the second face 18B of the base to the distal end 25A in a second rotational direction R2 which is anticlockwise to the first rotational direction R1. Directionality of the threading of the fixture bracket is thus opposite to that of the anchoring bracket. In the illustrated arrangements the second rotational direction R2 corresponds to left hand threading as will be understood by a person skilled in the art. The second rotational direction R2 may, additionally or alternatively, be regarded as being counterclockwise about the cylindrical body 25 when the helical path of the threading starts at the base 18 and terminates at the distal end 25A.

Each cylindrical body 24, 25 of the respective bracket 12, 13 is hollow along its full length from the distal end 24A, 25A to the second face 17B, 18B of the base so that the apertures 20 and central aperture 22 are accessible longitudinally through the cylindrical body when the respective bracket is placed with its first face 17A, 18A in butting engagement with the respective one of the supporting structure 4 and the wooden fixture 1. As such the apertures 20 and central aperture 22 are located on the base 17, 18 radially inwardly of the outside surface 26A, 27A of the cylindrical body.

Further, in each of the brackets 12, 13 the base 17, 18 extends radially outwardly to an outer peripheral edge 28, 29 of the base beyond the threaded outside surface 26A, 27A of the cylindrical body. The anchoring bracket 12 has a base 17 which is diametrically larger than that of the fixture bracket 13. The larger base 17 of the anchoring bracket may distribute over a larger area of the supporting structure's outer face 8A pressure which is generated by loading on the anchoring bracket 12, so as to resist deformation of the outer front face 8A. This may be particularly useful when the supporting structure is the wall where drywall defines the outer face 8A thereof, and the wooden fixture 1 is the handrail upon which a user transfers at least a portion of his/her weight while moving across a floor surface above which the handrail is mounted, as material hardness of drywall is relatively low in comparison to for example that of lumber typically used in home construction which means that the drywall is likely more susceptible to deformation due to loading on the anchoring bracket 12.

At that portion of the second face 17B, 18B of the base of each bracket, which is delimited between the outside surface 26A, 27A of the cylindrical body and the outer peripheral edge 28, 29 of the base, there is provided a ring of compressible material 30 encircling the outside surface of the cylindrical body 24, 25. This compressible ring 30, which may for example be a conventional O-ring, has a thickness which is negligible relative to a length of the cylindrical body 24, 25 from second face 17B, 18B of the base to distal end 24A, 25A and is arranged for sandwiching between an end of the coupling 15 and the base of the respective bracket 12 or 13. As such, the base 17, 18 acts as a stop for the ring of compressible material 30 and a face 30A of the ring distal to the second face 17B, 18B of the base thus defines a bearing surface for the coupling 15. The bearing surface defined by the face 30A is longitudinally movable relative to the base 17, 18 of which the second face 17B, 18B may too define a bearing surface but in this arrangement for the compressible ring 30. A purpose of the ring 30 will be better appreciated shortly hereinafter.

Turning now to the coupling, the coupling 15 forms a body 32 extending along a longitudinal axis with first and second ends 34 and 35 on either side of a central area 36 of the coupling which defines a central mid portion of the coupling. Each of the first and second ends 34, 35 are open and the body of the coupling is hollow along its full length such that the coupling body is tubular. As such, the coupling 15 has a cylindrical interior surface 38 which is threaded. The interior peripheral surface 38 has a first portion 39A extending longitudinally inwardly from the first end 34 to the central area which is threaded so as to follow a helical path winding about the coupling body 32 from the first end to the central area 36 in the first rotational direction R1, that is in the illustrated arrangements the first portion 39A is right hand threaded, so as to be able to mate with the anchoring bracket 12.

A second portion 39B of the interior surface 38 of the coupling, which extends longitudinally inwardly from the second end 35 to the central area 36, is threaded so as to follow a helical path winding about the coupling body 32 in the second rotational direction R2, that is in the illustrated arrangements the second portion 39B is left hand threaded, so as to be able to mate with the fixture bracket 13.

Further, an outside surface 41 of the coupling has diametrically opposite portions 43A and 43B which are flat for gripping to rotate the coupling in threadable mating with the first anchoring and second fixture brackets 12 and 13.

It will be appreciated that in the figures there are illustrated two arrangements of coupling 15 and 15' which are similar to one another with exception of the outer surface thereof. In one arrangement as illustrated for example in FIGS. 13-16, the outside surface 41 of the coupling 15 is substantially circular cylindrical with diametrically opposite areas which are flattened, so as to be recessed relative to a remainder of the outside surface, to define the gripping surfaces for rotating the coupling. In another arrangement of coupling as illustrated for example in FIGS. 17-22, the outside surface 41' of coupling 15' has rectangular cross-section along its full length thereby defining the diametrically opposite surfaces for gripping the coupling to rotate same. Furthermore, the coupling 15' has two such pairs of gripping surfaces 43A and 43B because the outside surface 41' comprises two pairs of planar surfaces which are parallel to one another. In the illustrated arrangement the coupling 15' is formed from circular cylindrical tubing supporting the threading as described earlier which is welded to square cylindrical tubing.

We now turn to use of the kit 10 for affixing the wooden fixture to the supporting structure in an installed state.

The kit 10 is typically one which requires retrofitting or adapting the wooden fixture in order to accept same. That is, the wooden fixture need not be prefabricated in a manner readied to accept the fixture bracket 13 as an opening 100 may be formed in a back face 2A of the wooden fixture which is arranged to face to the supporting structure, sized and also shaped for the base 18 of the fixture bracket to fit therein, using for example a conventional hand power drill (not shown). The depth of the opening 100 as measured from the back face 2A is substantially equal to a thickness of the base 18 of the fixture bracket from the first face 18A to second face 18B. A thickness of the body 2 of the wooden fixture from the back face 2A to an existing attractive front face 2B is greater than the thickness of the fixture bracket's base 18. Also, lengths of the fasteners 9 which are used are less than the thickness of the body of the wooden fixture 1 so that the fasteners do not protrude through the attractive front face 2B.

With the opening 100 in the back face 2A of the fixture 1, a marking device 200 may be temporarily inserted into each such opening 100 for forming an imprint on the supporting structure 4 at a proper location where the cooperating anchoring bracket 12 should be located. This is particularly useful when a plurality of the pairs of brackets 12, 13 are required at spaced locations on the fixture 1 to properly mount the fixture 1 to the supporting structure. Furthermore, the marking device is helpful when mounting a handrail in inclined orientation over a staircase S, as shown in FIG. 2, where both the spacing between each pair of adjacent brackets on the handrail, an angle of the inclined orientation, and a height of the handrail above the staircase define factors which must be taken into account in order to properly locate where the anchoring brackets should be on the supporting structure.

As such, the marking device 200 comprises a disc-shaped base portion 202 for inserting into the opening 100 with an enlarged external portion 204 which extends radially beyond the base portion so that when the base portion is in the opening a back 205A of the enlarged external portion 204 rests against the back face 2A of the fixture. The external portion 204 carries a flat face 205B distally to the back thereof where there is provided a conical tip 207 located centrally of the device 200. The tip 207 protrudes beyond the flat face 205B of the external portion 204 to a pointed end 208 so as to be driven into the supporting structure 4 for marking a center of the opening 100 by forming an imprint at the supporting structure's outer face 8A. The tip 207 may be driven into the supporting structure until the flat face 205B of the device is flush against the outer face 8A of the supporting structure. The marking device 200 may include apertures 209 so as to be arranged to pass therethrough conventional fasteners 9 so that the device may be more securely held at the wooden fixture 1 while in use.

With the necessary openings formed for each pair of brackets of the kit, the anchoring bracket 12 is fastened with the fasteners 9 of the illustrated arrangements to the supporting structure 4 such that the fasteners 9 are driven into the support members 5, and the fixture bracket 13 is fastened with the fasteners to the fixture 1 such that the fasteners are driven into the body of wood 2.

Thus the anchoring bracket 12 is fastened to the supporting structure 4 with the base's first face 17A in butting engagement with the front face 8A of the supporting structure. As such, the second face 17B of the base is located spaced away from, that is forwardly of, the front outer face 8A.

The fixture bracket 13 is fastened to the fixture with the base's first face 18A in butting engagement therewith and recessed from the back face 2A of the wooden fixture such that the second face 18B of the base is contiguous with the back face 2A.

Figure 26:
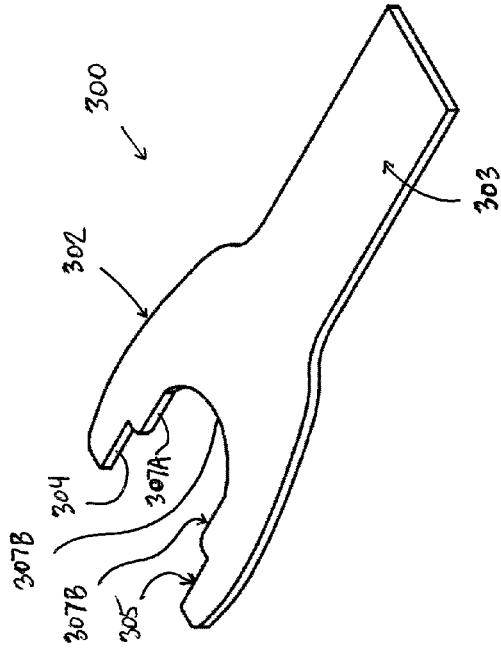
FIG. 26 is a perspective view of hand tool which is operable for rotating the coupling.
Figure 27:
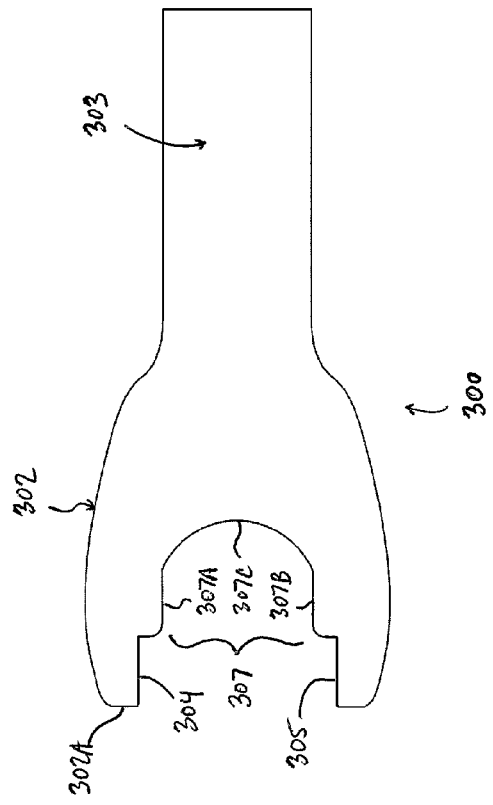
FIG. 27 is an elevational view of the hand tool of FIG. 26.

The fixture 1 is maneuvered into a position locating the cylindrical body 25 of the respective fixture bracket 13 in spaced relation to and longitudinally inline with the cylindrical body 24 of the corresponding anchoring bracket 12, the coupling 15 is placed therebetween and brought into engagement with each bracket 12, 13 so that the coupling 15 upon rotation can be threadably mated with the anchoring bracket 12 and the fixture bracket concurrently wherein the coupling is received over the cylindrical bodies 24, 25 of the brackets. A special wrench 300 as illustrated in FIGS. 26 and 27 may be used (which is typically sold together with the kit 10) so as to grip the diametrically opposite flat surface 43A and 43B to rotate the coupling for mating. By rotating the coupling 15 in a single rotational direction, which from a reference point of the base 18 of the fixture bracket 13 matches the second rotational direction R2 and from a reference point of the base 17 of the anchoring bracket 12 matches the first rotational direction R1, the brackets 12 and 13 are drawn towards one another by mating with the coupling 15.

As the respective end 34 and 35 of the coupling approaches the base of one of the anchoring bracket 12 and the fixture bracket 13, that end presses the ring of compressible material 30 at its exposed face 30A thereby sandwiching the ring 30 between the coupling and the base of the respective bracket 12, 13 at the second face 17B, 18B. As the coupling is rotated while already in butting engagement with the ring 30, the ring is squeezed so as to be compressed, its face 30A adjacent the respective end of the coupling being displaced towards the base 17, 18 of the bracket. Should an additional turn or rotation of the coupling be required, for example to move the flattened surfaces 43A and 43B of the coupling having the cylindrical exterior into positions not visible when the coupling is viewed from atop, then this is made possible by presence of the ring 30 while it also bridges what would otherwise be a gap between the end 34, 35 of the coupling and the second face 17B, 18B of the base of the respective bracket. That is, the ring 30 acts as a gasket between the base 17, 18 of the respective bracket 12, 13 and the coupling 15.

Figure 17:
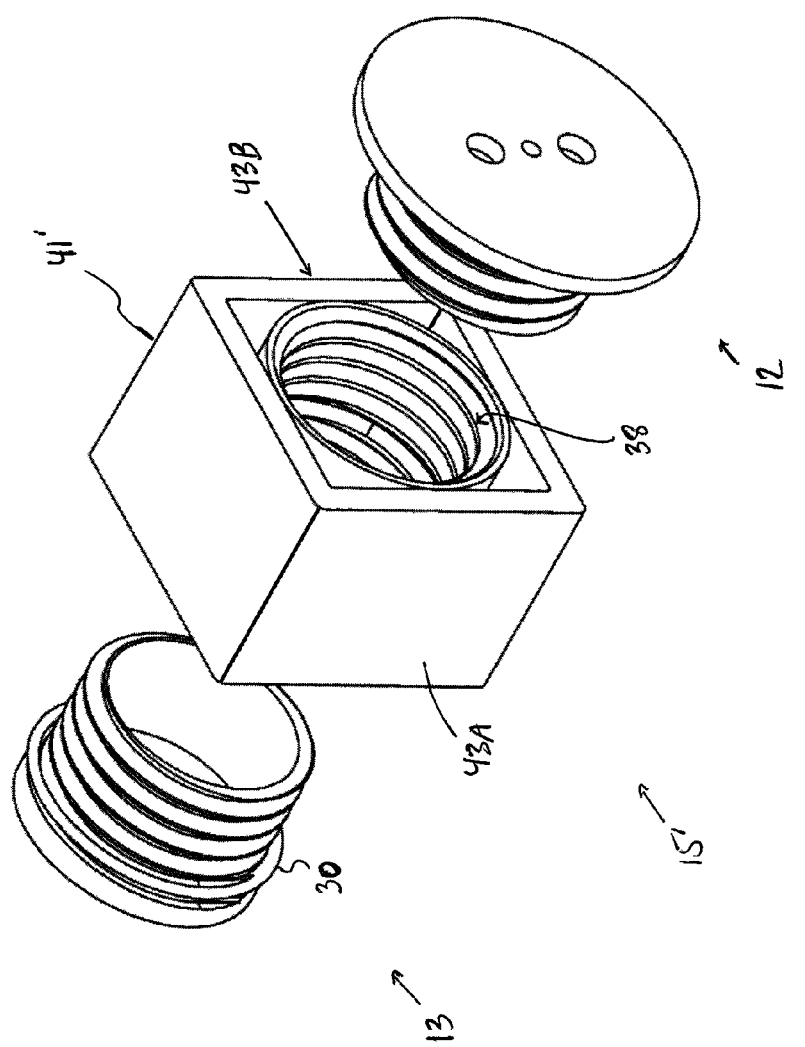
FIG. 17 is a perspective view of kit according to the present invention showing a second arrangement of coupling.
Figure 18:
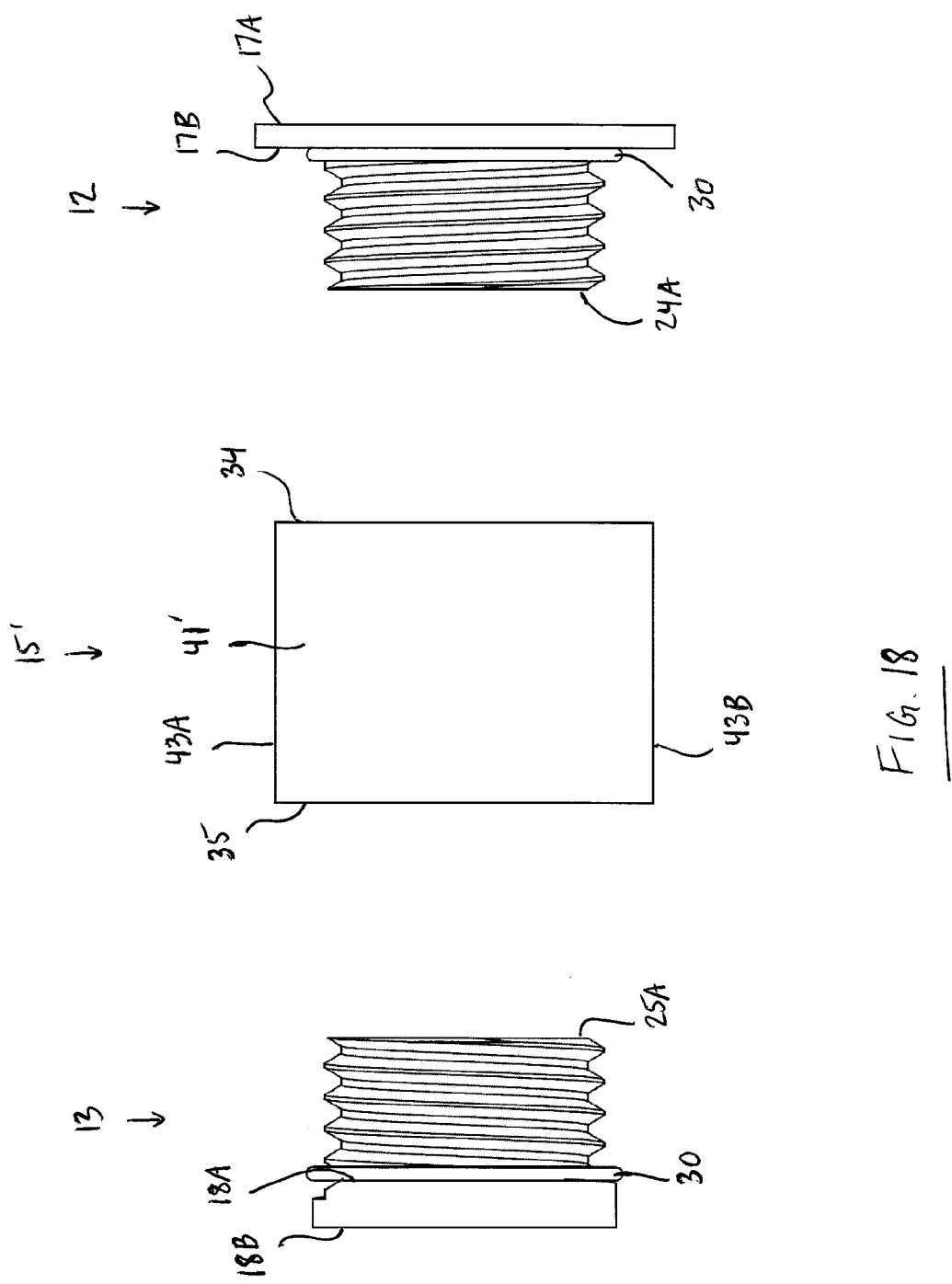
FIG. 18 is an elevational view of the kit of FIG. 17.
Figure 22:
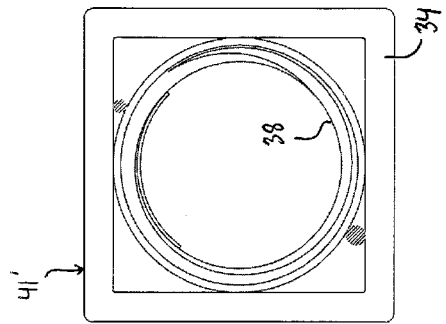
FIG. 22 is an end view from a second end of the coupling of FIG. 19.
Figure 19:
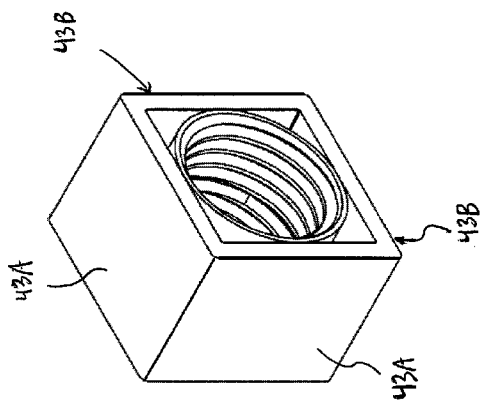
FIG. 19 is a perspective view of the second arrangement of coupling illustrated in FIG. 17.
Figure 21:
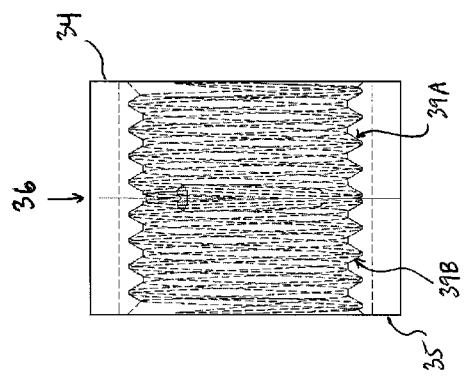
FIG. 21 is a cross-sectional view of the coupling of FIG. 19.
Figure 20:
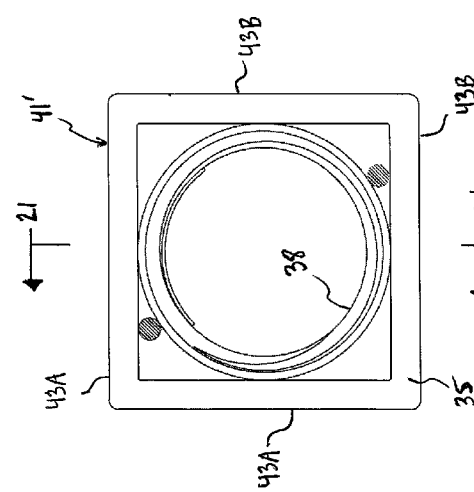
FIG. 20 is an end view from a first end of the coupling of FIG. 19.
Figure 24:
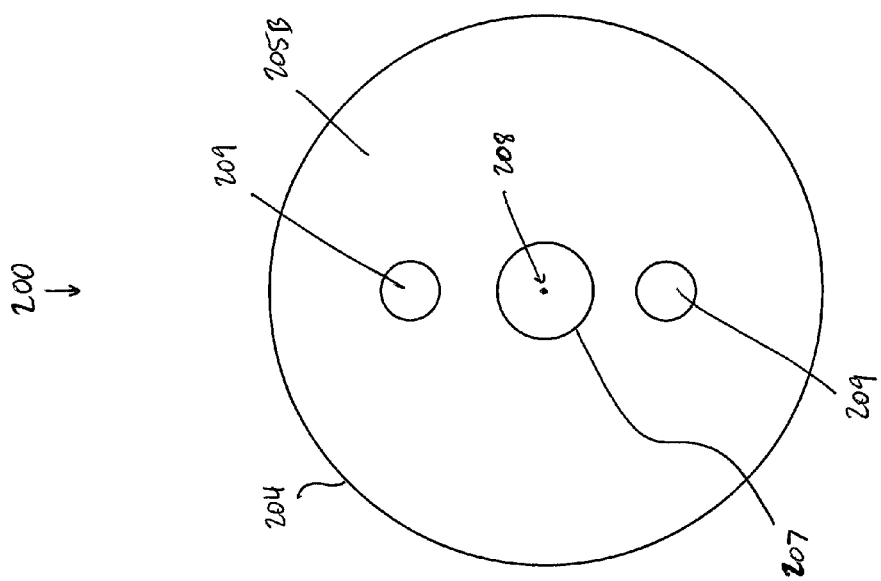
FIG. 24 is a plan view of the marking device of FIG. 23.
Figure 23:
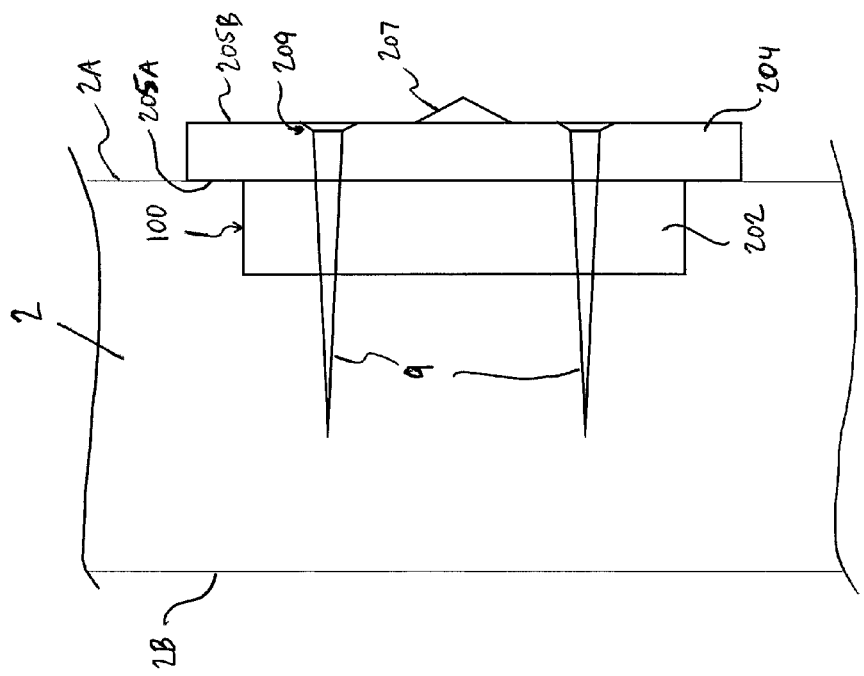
FIG. 23 is a transverse cross-sectional view of the wooden fixture with marking device received therein showing fasteners schematically.
Figure 25:
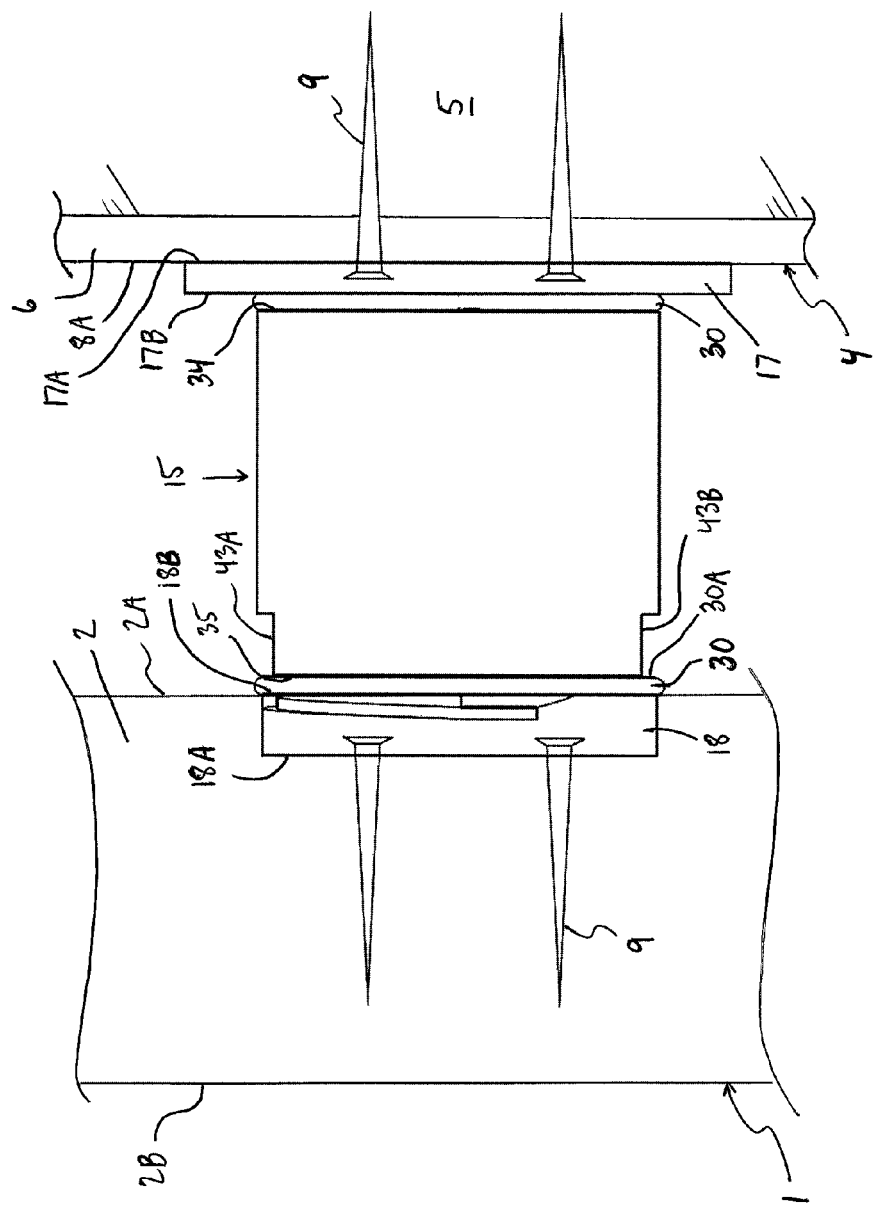
FIG. 25 is a transverse cross-sectional view of the wooden fixture and supporting structure affixed by the kit of FIG. 1 to the supporting structure in an installed state, where fasteners are illustrated schematically.

Thus, in the installed state as illustrated most clearly in FIG. 17, the wooden fixture 1 is affixed to the supporting structure 4 with the back face 2A of the fixture in spaced relation to the front outer face 8A of the supporting structure. In a space between the fixture 1 and the supporting structure's outer face 8A it is only the coupling 15 which is substantially visible as the second face 18B of the fixture bracket 13 is contiguous with the back face 2A of the fixture, and the base 17 of the anchoring bracket though in front of the front outer face 8A of the supporting structure has a thickness between its faces 17A and 17B which is negligible compared to the length of the coupling 15. The end 35 of the coupling is thus arranged at the fixture's back face 2A even though the coupling end 35 may be spaced therefrom by the thickness of the respective ring 30, which is negligible compared to the length of the coupling 15. The opposite end 34 of the coupling is spaced from the front face 8A of the supporting structure by the sum of the thicknesses of the anchoring bracket base 17 and ring 30.

Furthermore, the existing attractive front face 2B of the fixture which faces away from the supporting structure 4 is left uninterrupted by installation of the kit 10 giving the fixture 1 a clean look from the front and a floating appearance upon the supporting structure 4 as there are no clear signs at the front face 2B of the fixture that mounting hardware is present to hold the fixture to the supporting structure. Also, the kit 10 in the installed state provides a clean appearance in a space between the wooden fixture and the supporting structure with only the coupling effectively visible (and the base 17 of the anchoring bracket 12 though it is less visually prominent than the coupling).

It will be appreciated that the wrench 300 has a head 302 which is specially shaped to cooperate with either one of the couplings of the arrangements illustrated herein. At a terminus 302A of the wrench head 302, which forms a bifurcation from a lever handle 303 extending longitudinally of the wrench, there is a pair of surfaces 304, 305 in parallel spaced relation to one another which are arranged facing one another at a distance therefrom which is substantially equal to an outer diameter between any pair of the parallel, planar surfaces 43A, 43B of the coupling 15' with the square outer cross-section. The wrench 300 also includes a second surface 307 longitudinally inwardly of the pair of surfaces 304, 305 that is shaped to cooperate with the coupling having the circular cross-section. The second surface 307 has end portions 307A and 307B near the surfaces 304, 305 which are parallel to one another similar to the surfaces 304, 305. The second surface also includes an arcuate portion 307C following an arcuate path between the end portions 307A, 307B so as to be arranged to follow the outer surface 41 of the coupling 15 with the circular cross-section as the end portions 307A, 307B engage the flattened surface portions 43A, 43B of the coupling.

In other arrangements employing the square shaped coupling 15', the base of the anchoring bracket 12 may be rectangular in shape, for example square, such that the outer peripheral edge 28 of the bracket 12 follows a contour of a cross-section of the outer surface of the coupling 15'.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A kit for mounting a wooden fixture comprising a body of wood on a supporting structure formed by at least one or more support members arranged at spaced positions from one another comprising:
   a first bracket including a base arranged for fastening to the supporting structure;
   the base of the first bracket having a first face for abutting the supporting structure and a second face opposite thereto;
   the first bracket including a cylindrical body extending longitudinally from the base at its second face to a distal end of the cylindrical body which is spaced longitudinally from the second face;
   the cylindrical body of the first bracket having a surface which is threaded so as to follow a helical path winding about the cylindrical body from the second face of the base to the distal end of the cylindrical body in a first rotational direction;
   said surface of the cylindrical body of the first bracket that is threaded being an outside surface of the cylindrical body;
   a second bracket including a base arranged for fastening to the wooden fixture;
   the base of the second bracket having a first face for abutting the wooden fixture and a second face opposite thereto;
   the second bracket including a cylindrical body extending longitudinally from the base of the second bracket at the second face of the base to a distal end of the cylindrical body which is spaced longitudinally from the second face of the base of the second bracket;
   the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;
   said surface of the cylindrical body of the second bracket that is threaded being an outside surface of the cylindrical body;
   the first and second brackets including a fastening arrangement arranged for providing connection of the first bracket to the supporting structure and the second bracket to the wooden fixture;
   a coupling forming a body extending along a longitudinal axis with first and second ends on either side of a central area of the coupling;
   the coupling having a surface at each of the first and second ends that is threaded;
   the first and second ends of the coupling being open;
   the coupling being hollow at the first and second ends such that said surface of the coupling thereat which is threaded is an interior surface of the coupling;
   the threaded surface having a first portion extending longitudinally inwardly from the first end of the coupling towards the central area and a second portion extending longitudinally inwardly from the second end of the coupling towards the central area;
   the first portion of said surface of the coupling being threaded so as to follow a helical path winding about the body from the first end inwardly towards the central area in the first rotational direction so as to cooperate with threading of the first bracket for mating with the first bracket;
   the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure.

2. A kit for mounting a wooden fixture according to claim 1 wherein the distal end of the cylindrical body of the first and second brackets is open and the cylindrical body thereof is hollow along its length from the distal end to the second face of the base.

3. A kit for mounting a wooden fixture according to claim 1 wherein the base of the first and second brackets extends radially beyond the outside surface of the cylindrical body.

4. A kit for mounting a wooden fixture according to claim 1 wherein the coupling includes diametrically opposite surfaces on an outside thereof which are flat for gripping to rotate the coupling in threadable mating with the first and second brackets.

5. A kit for mounting a wooden fixture according to claim 1 wherein each one of the first and second brackets includes a ring of compressible material at the second face of the base encircling the outside surface of the cylindrical body that is arranged for sandwiching between the respective one of the first and second ends of the coupling and the base of the respective one of the first and second brackets.

6. A kit for mounting a wooden fixture according to claim 1 wherein the coupling is hollow along its length from the first end to the second end.

7. A kit for mounting a wooden fixture according to claim 1 wherein the fastening arrangement of each of the first and second brackets comprises at least one aperture extending longitudinally through the base form the first face to the second face for passing a conventional fastener therethrough.

8. A kit for mounting a wooden fixture comprising a body of wood on a supporting structure formed by at least one or more support members arranged at spaced positions from one another, in combination with the wooden fixture and the supporting structure, comprising:

a first bracket including a base arranged for fastening to the supporting structure;

the base of the first bracket having a first face for abutting the supporting structure and a second face opposite thereto;

the first bracket including a cylindrical body extending longitudinally from the base at its second face to a distal end of the cylindrical body which is spaced longitudinally from the second face;

the cylindrical body of the first bracket having a surface which is threaded so as to follow a helical path winding about the cylindrical body from the second face of the base to the distal end of the cylindrical body in a first rotational direction;

said surface of the cylindrical body of the first bracket that is threaded being an outside surface of the cylindrical body;

a second bracket including a base arranged for fastening to the wooden fixture;

the base of the second bracket having a first face for abutting the wooden fixture and a second face opposite thereto;

the second bracket including a cylindrical body extending longitudinally from the base of the second bracket at the second face of the base to a distal end of the cylindrical body which is spaced longitudinally from the second face of the base of the second bracket;

the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;

said surface of the cylindrical body of the second bracket that is threaded being an outside surface of the cylindrical body;

the first and second brackets including a fastening arrangement arranged for providing connection of the first bracket to the supporting structure and the second bracket to the wooden fixture;

a coupling forming a body extending along a longitudinal axis with first and second ends on either side of a central area of the coupling;

the coupling having a surface at each of the first and second ends that is threaded;

the first and second ends of the coupling being open;

the coupling being hollow at the first and second ends such that said surface of the coupling thereat which is threaded is an interior surface of the coupling;

the threaded surface having a first portion extending longitudinally inwardly from the first end of the coupling towards the central area and a second portion extending longitudinally inwardly from the second end of the coupling towards the central area;

the first portion of said surface of the coupling being threaded so as to follow a helical path winding about the body from the first end inwardly towards the central area in the first rotational direction so as to cooperate with threading of the first bracket for mating with the first bracket;

the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure;

the wooden fixture having a face arranged for facing the supporting structure;

the supporting structure defining a face arranged for facing the wooden fixture;

in the installed state including when the first bracket is fastened to the supporting structure and the second bracket is fastened to the wooden fixture, the second face of the base of the second bracket being contiguous with the face of the wooden fixture and the coupling being received over the cylindrical bodies of the first and second brackets such that the second end of the coupling is at the face of the wooden fixture.

9. A kit for mounting a wooden fixture according to claim 8 wherein there is provided for each one of the first and second brackets a ring of compressible material encircling the outside surface of the cylindrical body and wherein the ring of compressible material is sandwiched between the second face of the base thereof and the respective end of the coupling so that the second end of the coupling is spaced from the face of the wooden fixture by a thickness of the ring of compressible material.

10. A kit for mounting a wooden fixture according to claim 8 wherein the first face of the base of the first bracket is arranged in butting engagement with the face of the supporting structure.

11. A kit for mounting a wooden fixture according to claim 8 wherein the base of the first bracket fastened to the supporting structure extends radially outwardly beyond the outside surface of the cylindrical body of the first bracket.

12. A kit for mounting a wooden fixture according to claim 8 wherein the wooden fixture has an attractive existing front face opposite the face where the second bracket is fastened, the attractive existing front face facing away from the supporting structure and being uninterrupted in the installed state of the kit.

13. A method for mounting a wooden fixture on a supporting structure formed by at least one or more support members arranged at spaced positions from one another comprising:

- providing a kit for mounting the wooden fixture on the supporting structure, the kit comprising:
  - a first bracket including a base arranged for fastening to the supporting structure;
  - the base of the first bracket having a first face for abutting the supporting structure and a second face opposite thereto;
  - the first bracket including a cylindrical body extending longitudinally from the base at its second face to a distal end of the cylindrical body which is spaced longitudinally from the second face;
  - the cylindrical body of the first bracket having a surface which is threaded so as to follow a helical path winding about the cylindrical body from the second face of the base to the distal end of the cylindrical body in a first rotational direction;
  - a second bracket including a base arranged for fastening to the wooden fixture;
  - the base of the second bracket having a first face for abutting the wooden fixture and a second face opposite thereto;
  - the second bracket including a cylindrical body extending longitudinally from the base of the second bracket at the second face of the base to a distal end of the cylindrical body which is spaced longitudinally from the second face of the base of the second bracket;
  - the cylindrical body of the second bracket having a surface which is threaded so as to follow a helical path winding about the cylindrical body from the second face of the base to the distal end of the cylindrical body in a second rotational direction which is anticlockwise to the first rotational direction so as to be opposite the helical path of threading of the first bracket;
  - the first and second brackets including a fastening arrangement arranged for providing connection of the first bracket to the supporting structure and the second bracket to the wooden fixture;
  - a coupling forming a body extending along a longitudinal axis with first and second ends on either side of a central area of the coupling;
  - the coupling having a surface at each of the first and second ends that is threaded;
  - the threaded surface of the coupling having a first portion extending longitudinally inwardly from the first end of the coupling towards the central area and a second portion extending longitudinally inwardly from the second end of the coupling towards the central area;
  - the first portion of said surface of the coupling being threaded so as to follow a helical path winding about the body from the first end inwardly towards the central area in the first rotational direction so as to cooperate with threading of the first bracket for mating with the first bracket;
  - the second portion of said surface of the coupling being threaded so as to follow a helical path winding about the body from the second end inwardly towards the central area in the second rotational direction which is anticlockwise to the first rotational direction so as to cooperate with threading of the second bracket for mating with the second bracket concurrently as the first portion is mated with the first bracket so as to connect the wooden fixture to the supporting structure in an installed state of the kit where the wooden fixture is affixed in spaced relation to the supporting structure;
- providing the wooden fixture which has a back face arranged for facing the supporting structure;
- the wooden fixture having an attractive existing front face arranged for facing away from the supporting structure;
- providing the supporting structure which defines a front face arranged for facing the wooden fixture;
- fastening the first bracket to the supporting structure at the front face thereof with the first face of the base of the first bracket in butting engagement with the supporting structure;
- fastening the second bracket to the wooden fixture at the back face thereof with the first face of the base of the second bracket in butting engagement with the wooden fixture;
- with the threaded cylindrical bodies of the first and second brackets which are attached to the respective one of the supporting structure and the wooden fixture held spaced apart and which are arranged longitudinally inline one with another, threadably mating the coupling with each of the first and second brackets concurrently so as to mount the wooden fixture with the back face thereof towards the supporting structure leaving the attractive existing front face of the wooden fixture uninterrupted.

14. A method for mounting a wooden fixture according to claim 13 wherein the step of fastening the second bracket to the wooden fixture comprises forming an opening in the back face thereof to receive the second bracket.

15. A method for mounting a wooden fixture according to claim 13 wherein the first face of the base of the second bracket is recessed from the back face of the wooden fixture in the installed state such that the second face of the base is contiguous therewith.

16. A method for mounting a wooden fixture according to claim 13 wherein the step of threadably mating the coupling comprises rotating the coupling in a single rotational direction to draw the first and second brackets towards one another.

* * * * *